United States Patent
Seelig et al.

(10) Patent No.: US 6,462,432 B1
(45) Date of Patent: Oct. 8, 2002

(54) METHOD AND DEVICE FOR INDUCTIVE TRANSMISSION OF ELECTRIC POWER TO A PLURALITY OF MOBILE CONSUMERS

(75) Inventors: Anton Seelig, Flörsheim; Samir Salama, Berlin; Erik Lindig, Hattersheim; Eberhard Kaus, Nauheim, all of (DE)

(73) Assignee: ALSTOM Anlagen- und Automatisierungstechnik GmbH, Frankfurt (DE)

( * ) Notice: Subject to any disclaimer, the term of this patent is extended or adjusted under 35 U.S.C. 154(b) by 0 days.

(21) Appl. No.: 09/403,044

(22) PCT Filed: Aug. 6, 1998

(86) PCT No.: PCT/EP98/04904

§ 371 (c)(1),
(2), (4) Date: Jul. 31, 2000

(87) PCT Pub. No.: WO99/09634

PCT Pub. Date: Feb. 25, 1999

(30) Foreign Application Priority Data

Aug. 18, 1997 (DE) ........................................ 197 35 624

(51) Int. Cl.[7] ................................................ H02J 5/00
(52) U.S. Cl. ........................................ 307/33; 307/104
(58) Field of Search ...................... 307/17, 104, 31–35

(56) References Cited

U.S. PATENT DOCUMENTS 5,889,384 A * 3/1999 Hayes et al. ................ 320/108
6,005,304 A * 12/1999 Seelig ......................... 307/104

FOREIGN PATENT DOCUMENTS

| DE | 4236340 A1 | 5/1994 |
| DE | 4446779 A1 | 6/1996 |
| WO | WO 92/17929 | 10/1992 |
| WO | WO 96/20526 | 7/1996 |

OTHER PUBLICATIONS

A. W. Green and J. T. Boys "10kHz Inductively Coupled Power Transfer—Concept and Control" In: "Power Electronics and Variable–Speed Drives", Oct. 26–28, 1994, Conference Publication No. 399, C IEE, 1994, pp. 694–699.

* cited by examiner

*Primary Examiner*—Fritz Fleming
(74) *Attorney, Agent, or Firm*—Jones, Tullar & Cooper, P.C.

(57) ABSTRACT

What follows is a description of a method and device for the inductive transmission of electric power from a medium-frequency source with a frequency of ($f_M$) to one or more mobile consumers which are inductively coupled to the transmission line via an extended transmission line.

18 Claims, 7 Drawing Sheets

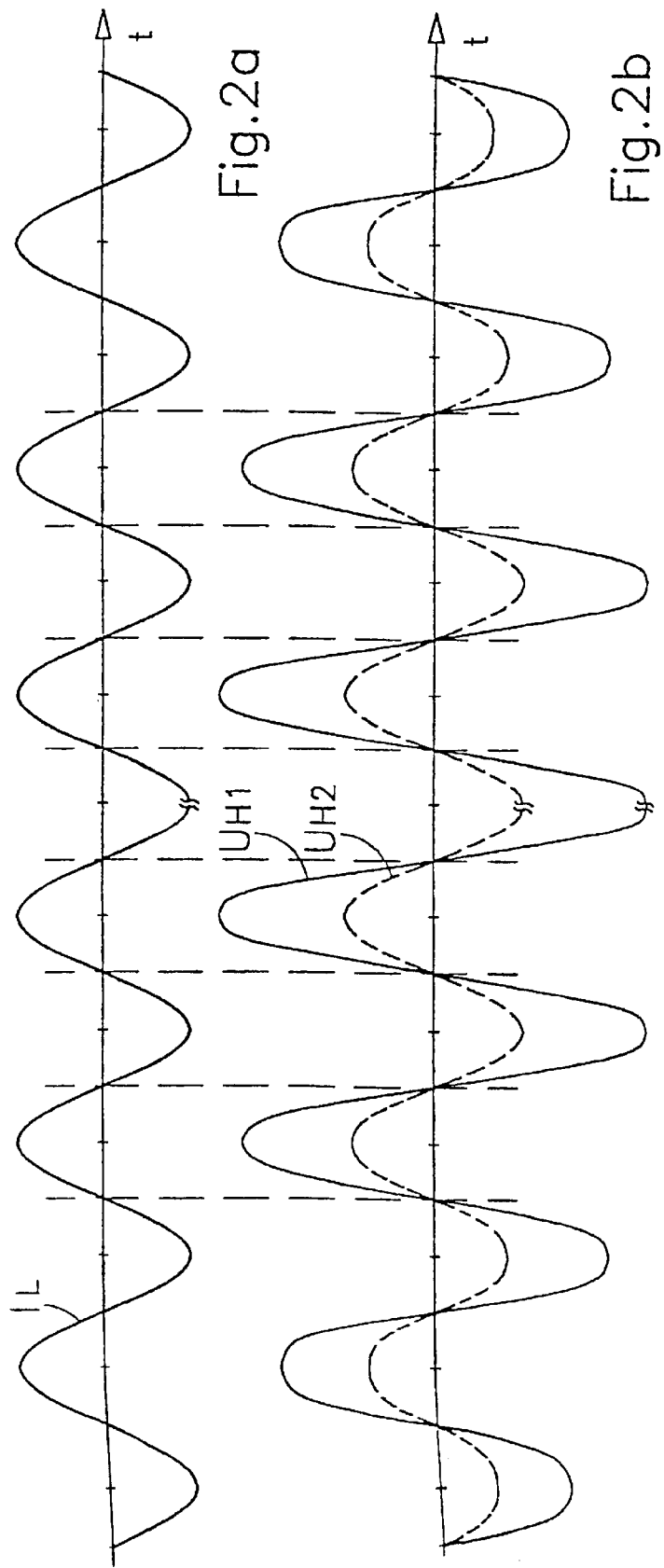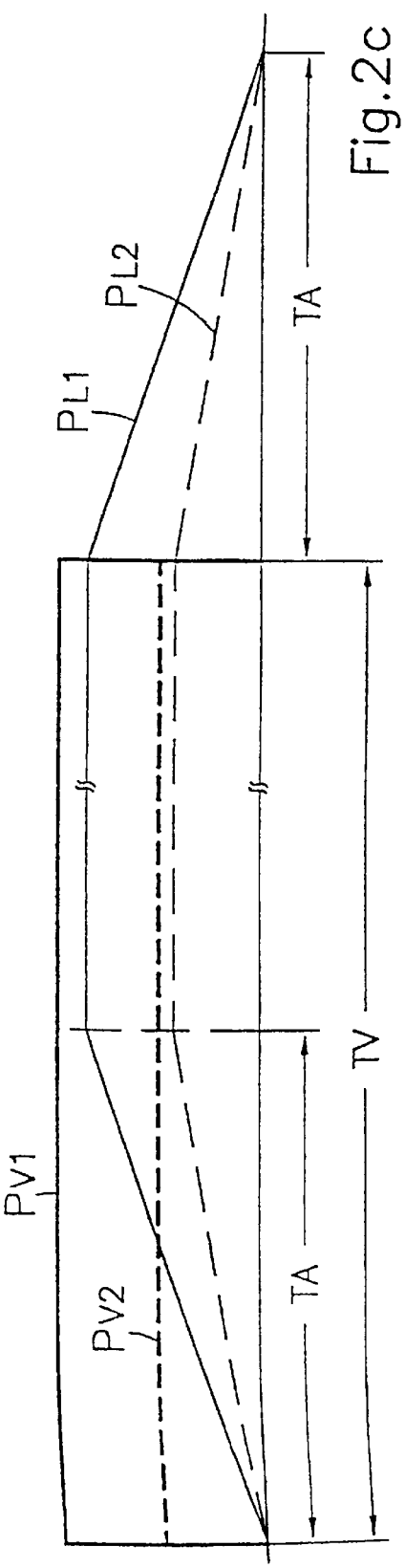

$Z = R = \sqrt{\dfrac{L1}{C1}}$ $\varphi_1 = 45°$ $Z = 0$

METHOD AND DEVICE FOR INDUCTIVE TRANSMISSION OF ELECTRIC POWER TO A PLURALITY OF MOBILE CONSUMERS

FIELD OF THE INVENTION

The present invention relates to a method and a device for inductive transmission of electric power to a plurality of mobile consumers, as generically known from International Patent Disclosure WO-A1 96/20526.

BACKGROUND OF THE INVENTION

In International Patent Disclosure WO-A1 96/20526 (corresponding to German Patent Disclosure DE 44 46 779), a method for inductive transmission of electric power from a medium-frequency source at a frequency $f_M$ to one or more mobile consumers via an extended transmission line and via inductive pickups $I_{AX}I_{AY}$, assigned to the mobile consumers, with downstream converter-actuators for adjusting the power $P_{LX}$, $P_{LY}$ that is picked up from the transmission line and delivered to buffer stores to which the mobile consumers are connected, is disclosed, in which the transmission line is supplied from a current source with a medium-frequency current ($I_L$) that is constant in its effective value during the power transmission.

A method and a device for inductive transmission of electric power to a plurality of mobile consumers are known from International Patent Disclosure WO 92/17929 A1 and the publication by A. W. Green and T. Boys, Power Electronics and Variable-Speed Drives, Oct. 26–28, 1994, Conference Publication No. 399, CIEE, 1994, pages 694–698, which describes the invention claimed in WO 92/17929.

As described in conjunction with FIGS. 1–3 of this publication, the current drawn from a rotary current network is rectified and delivered to an inverter, comprising. the IGBTs S3 and S4 and the magnetically coupled inductive resistors L2a and L2b, via a current actuator that comprises the IGBTs S1, S2, the diodes D1, D2, and a storage choke $L_d$. This inverter generates a medium-frequency alternating voltage of 10 kHz and feeds it into a parallel oscillator circuit formed by an inductive resistor L1 and a capacitor C1. The inductive resistor L1 is the transmission line, embodied as an extended double line, of a system for inductive transmission of electric power to a plurality of mobile consumers. The mobile consumers are magnetically coupled to the transmission line via inductive pickups, as shown in FIG. 8 of the publication. In turn, together with a capacitor, the coil of the inductive pickup forms a parallel oscillator circuit, as shown in FIGS. 1, 2 and 10 of the publication.

The current transmitted from the transmission line to the parallel oscillator circuit of the mobile pickup is rectified, according to FIG. 10, in a converter-actuator designated here as a pickup- controller, is then smoothed with a choke, and then, depending on the power demanded by the consumers connected to the o controller, is either delivered to the capacitor that buffer-stores the output voltage $V_0$ of the controller, or is carried past this buffer capacitor. The decision here is made by the Schmitt trigger of the controller, which compares the output voltage $V_0$ with a corresponding reference voltage and blocks the IGBT if the output voltage is too low, so that the current recharges the output buffer capacitor, or puts the IGBT in the conductive state, so that the current flows past the output buffer capacitor, if the output voltage $V_0$ has exceeded an upper limit value.

In this power transmission method, as described in column 1, page 697 and in conjunction with FIG. 7 of the publication, if there are sudden load changes, then undesired transient phenomena occur in the overall transmission system, which is associated with mutual influence in terms of the energy transmission of a plurality of vehicles and necessitates additional damping provisions.

The causes of these undesired transient phenomena are as follows:

With the switching of the pickup-controller, which does not enable any infinitely variable change in the power picked up by the inductive pickup or in the voltage supplied to the transmission line, a strong excitation of the parallel oscillator circuit formed by the transmission line and the capacitor C1 in FIG. 3 becomes effective.

The energy picked up from the transmission line is first drawn from the parallel oscillator circuit; because of the inductive resistors in the supplying converter, it is only after a delay, and after a voltage change has been detected at the capacitor C1, that this energy is replenished via the supplying converter.

SUMMARY OF THE INVENTION

The object of the present invention is to provide a method for inductive transmission of electric power to a plurality of mobile consumers that has no transient phenomena in the transmission line current that is common to all the mobile consumers.

This object is attained by a maximum adjusting time which lasts for only a few half-periods of the medium frequency, the output voltage of the medium-frequency source adjusts infinitely variably to the value that corresponds to the total variable power picked up from the transmission line, and that the converter-actuator connected between the buffer memory and the inductive power pickup of each mobile consumer adjusts the mean consumer power picked up from the transmission line and delivered to the buffer memory, infinitely variably and with a limited rate of change, within an adjusting time which is longer than the adjusting time of the medium-frequency source, with the medium-frequency source having a maximum adjusting time of its output signal that is less than the adjusting time of the power pickup at the consumer can be learned from the dependent claims and the specification.

The essence of the present invention is considered to be the creation of a method and a device for inductive transmission of electric power from a stationary transmission line to mobile consumers, in which:

the transmission line is supplied with a constant medium frequency current $I_L$ from a medium-frequency source whose output voltage $U_L$ adjusts infinitely variably within a brief adjusting time $T_S$, which lasts only a few half-periods of the medium frequency, to the variable value corresponding to the consumer power, and the rate of change of the power consumption from the transmission line via the inductive pickups of the mobile systems is limited by converter-actuators, whose adjusting time $T_A$ is longer than the adjusting time $T_S$ of the medium-frequency source, in such a way that the medium-frequency source can easily follow with the appropriate power output.

The present invention has the advantage that transient phenomena are reliably avoided. Another advantage is that at the same time, mutual influence of mobile consumers on each other can be precluded.

Compared with the prior art, the method of the present invention has the following further advantages as well:

The transmission frequency is power-independent and constant; the inductive pickups are always operated at their resonant point, that is, their operating point of optimal utilization.

Turning partial capacitors on or off in the event of load changes, as shown for instance on page 698 and described in conjunction with FIG. 12 of the publication cited as prior art, is not necessary.

BRIEF DESCRIPTION OF THE DRAWINGS

The characteristics that are essential to the present invention are described in detail below in conjunction with the drawings. Shown are:

FIG. 2a: which is a plot over time of the current $I_L$ impressed into the transmission line;

FIG. 2b: which is a plot over time of the voltage $U_H$ coupled into the transmission line by an inductive pickup of a mobile system;

FIG. 2c: which is a plot over time of the consumer power $P_V$ and the mean value of the power $P_L$ picked up from the transmission line;

FIG. 6b: which is a vector diagram for the substitute circuit diagram of FIG. 5a;

DESCRIPTION OF PREFERRED EMBODIMENTS

Figure 1:
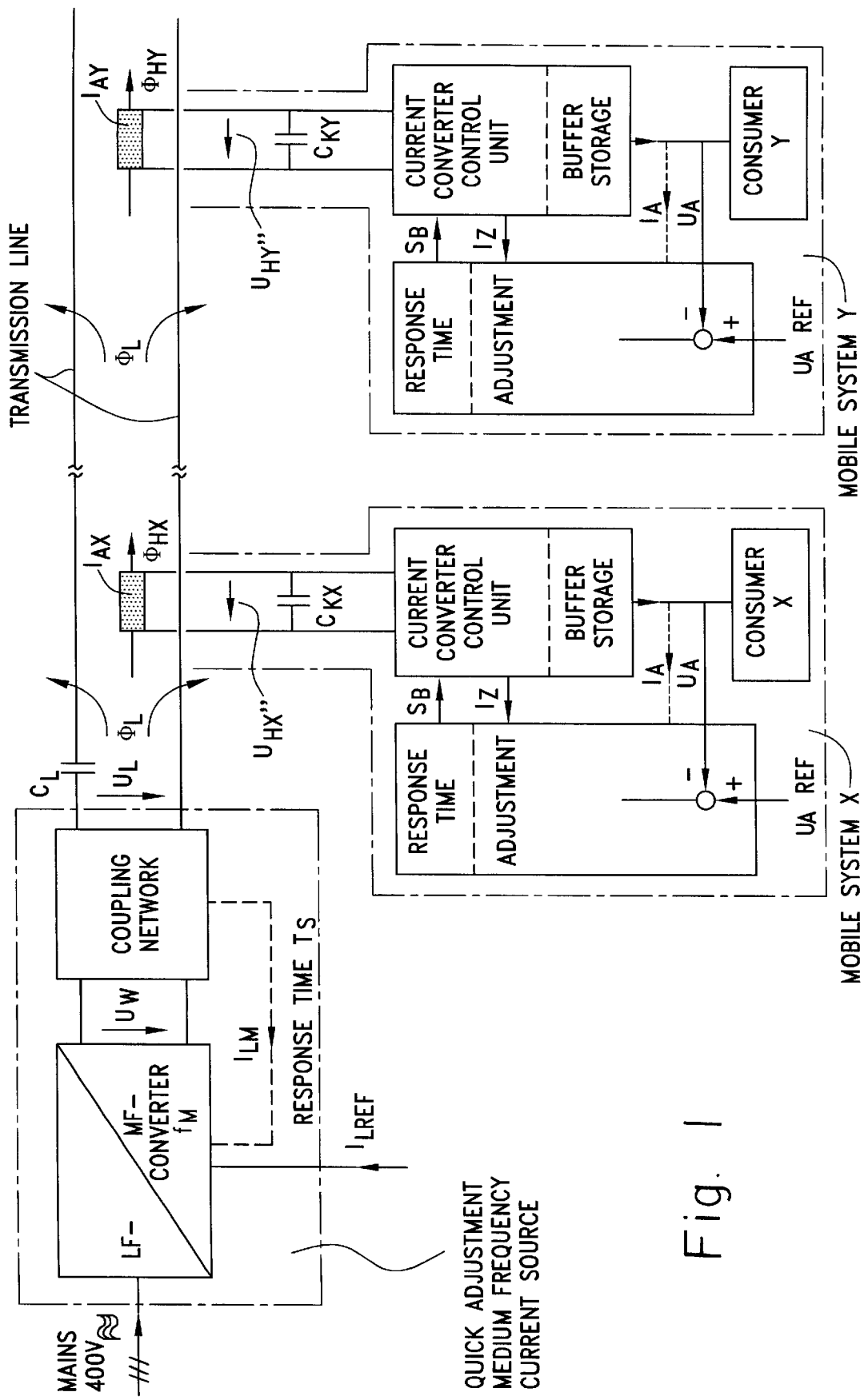
FIG. 1: which is a block circuit diagram of the entire system for inductive transmission of electric power to a plurality of mobile consumers.

The method of the invention will first be explained generally, in conjunction with the block circuit diagram shown in FIG. 1 and the graphs in FIGS. 2a–2c.

The block circuit diagram schematically shows a transmission line, embodied for instance as a double line, which is connected via a series-connected capacitor $C_L$ to a medium-frequency source that adjusts fast and infinitely variably. The invention is not dependent on how the transmission line is embodied and can therefor also be applied to the coaxial conductor arrangement of German Patent DE 44 46 779 C2. The fast-adjusting medium-frequency source realized from a low-frequency/medium-frequency converter (LF/MF converter), described in further detail hereinafter and having a downstream coupling network, impresses a sinusoidal medium-frequency current $I_L$ of constant effective value at the frequency $f_M$ into the transmission line. A preferred frequency $f_M$ is in the range of around 20 kHz.

The inductive pickups $I_{AX}$ and $I_{AY}$ of for instance two mobile systems X and Y are coupled magnetically or inductively to the transmission line. This coupling is effected by means of the primary magnetic fluxes $\phi_{HX}$ and $\phi_{HY}$, shown in FIG. 1, which jointly penetrate the conductor loop of the transmission line and the winding of the inductive pickups. These magnetic fluxes have the same frequency as the current $I_L$ of the transmission conductor, and they induce corresponding voltages in it. In addition, over the entire length of the transmission line, the current $I_L$ additionally generates the conductor flux $\phi_L$, which induces a high inductive voltage drop on the transmission line.

The capacitor $C_L$ connected in series with the transmission line is dimensioned in particular such that the inductive voltage drop on the transmission line is completely compensated for by the voltage at the capacitor $C_L$. If the ohmic resistance on the line is ignored, then the voltage $U_L$ occurring at the output of the current source is equal to the sum of the voltages induced in the conductor loop by the primary magnetic fluxes $\phi_{HX}$ and $\phi_{HY}$. The product of these voltages and the current $I_L$ and the cosine of any phase displacement that there may be between the two variables is the power transmitted to the mobile systems via the inductive pickups.

A current source according to the invention that adjusts fast and infinitely variably means that the current source can adjust to power changes, i.e. the requisite output voltage $U_L$ infinitely variably and at least as fast as these changes are supplied to the transmission line via the inductive pickups, or even faster.

With this precondition, the voltage $U_L$ at the output of the medium-frequency source is at all times, even in the event of dynamic load changes, equal to the sum of the voltages induced in the transmission line by the inductive pickups; in other words, the voltages at the inductive resistor of the line and at the capacitor $C_L$ connected in series with this resistor do not change, and transient phenomena do not occur.

Since the adjusting time $T_S$ of the medium-frequency source cannot become arbitrarily short, in the mobile systems the power picked up from the transmission line via the inductive pickups is adjusted according to the invention infinitely variably and with a limited rate of change, so that for the transmitted power, the result is an adjusting time $T_A$ that is longer than the adjusting time $T_S$ of the medium-frequency source.

The medium-frequency source has a maximum adjusting time ($T_S$) of its output signal that is shorter than the adjusting time ($T_A$) of the power consumption at the consumer. The transmission line, located between the medium-frequency source and the consumer, is embodied as a series oscillator circuit for this medium frequency.

To that end, a converter-actuator is preferably connected, as FIG. 1 shows, in the mobile systems between an energy buffer store, from which the connected consumers can draw power at an arbitrary rate of rise, and the inductive pickup IA; the converter-actuator is triggered by a signal $S_B$ in such a way that the power consumption from the transmission line is infinitely variable and has a limited rate of change. The information, contained in the signal $S_B$, for limiting the rate of change of the power consumption can preferably be formed in a limitation stage provided specifically for the purpose, or in another version it can advantageously be formed in the regulating stage, which regulates the energy buffer store output voltage $U_A$, which is delivered to the consumer, to the desired value $U_{ASOLL}$.

Together with the inductance of the pickup, the capacitor $C_K$ connected parallel to the inductive pickup $I_A$ at the input of the converter-actuator forms a parallel oscillating circuit, which comes into resonance at the frequency $f_M$ of the transmission line current $I_L$. At this resonance, the capacitor $C_K$ furnishes all the magnetizing current of the inductive pickup, and the transmission line is loaded solely with effective power, as shown by the phase coincidence of the transmission line current $I_L$ shown in FIG. 2a and the voltages $U_{H1}$ and $U_{H2}$ shown in FIG. 2b that are coupled into the transmission conductor by the inductive pickup IA. In FIG. 2c, as examples, two suddenly changing consumer powers $P_{V1}$ and $P_{V2}$ of different magnitudes and of the duration $T_V$ are shown, along with the powers $P_{L1}$ and $P_{L2}$ which are picked up from the transmission line and whose rise is limited by the converter-actuator. In accordance with this power course, the voltages coupled into the transmission line also vary steadily during the rise time $T_A$.

In operating periods when all the mobile consumers simultaneously have a lesser power demand, and in particular when the drive mechanisms that effect the motion are all at a stop, ir while the entire system is being started up and is being stopped, it is advantageous to supply lesser currents $I_L$ into the transmission conductor. The low-frequency/medium-frequency converter (LF/MF converter) therefore, as shown in FIG. 1, has an input signal $IL_{SOLL}$, which makes it possible to specify arbitrary currents $I_L$ between the value of zero and a maximum value. The demands made in terms of the rate of change of this signal are slight. It can be made substantially less than the rate of change of the power picked up from the transmission line.

For many applications, an unregulated adjustment of the transmission conductor current is sufficiently precise. If major interference variables are involved, however, greater precision of the transmission conductor current is advantageously attainable, if this current is measured and the measurement variable $I_{LM}$ is delivered, as indicated by dashed lines in FIG. 1, to the LF/MF converter for the sake of regulating the transmission conductor current $I_L$ to the desired value $IL_{SOLL}$.

Figure 3:
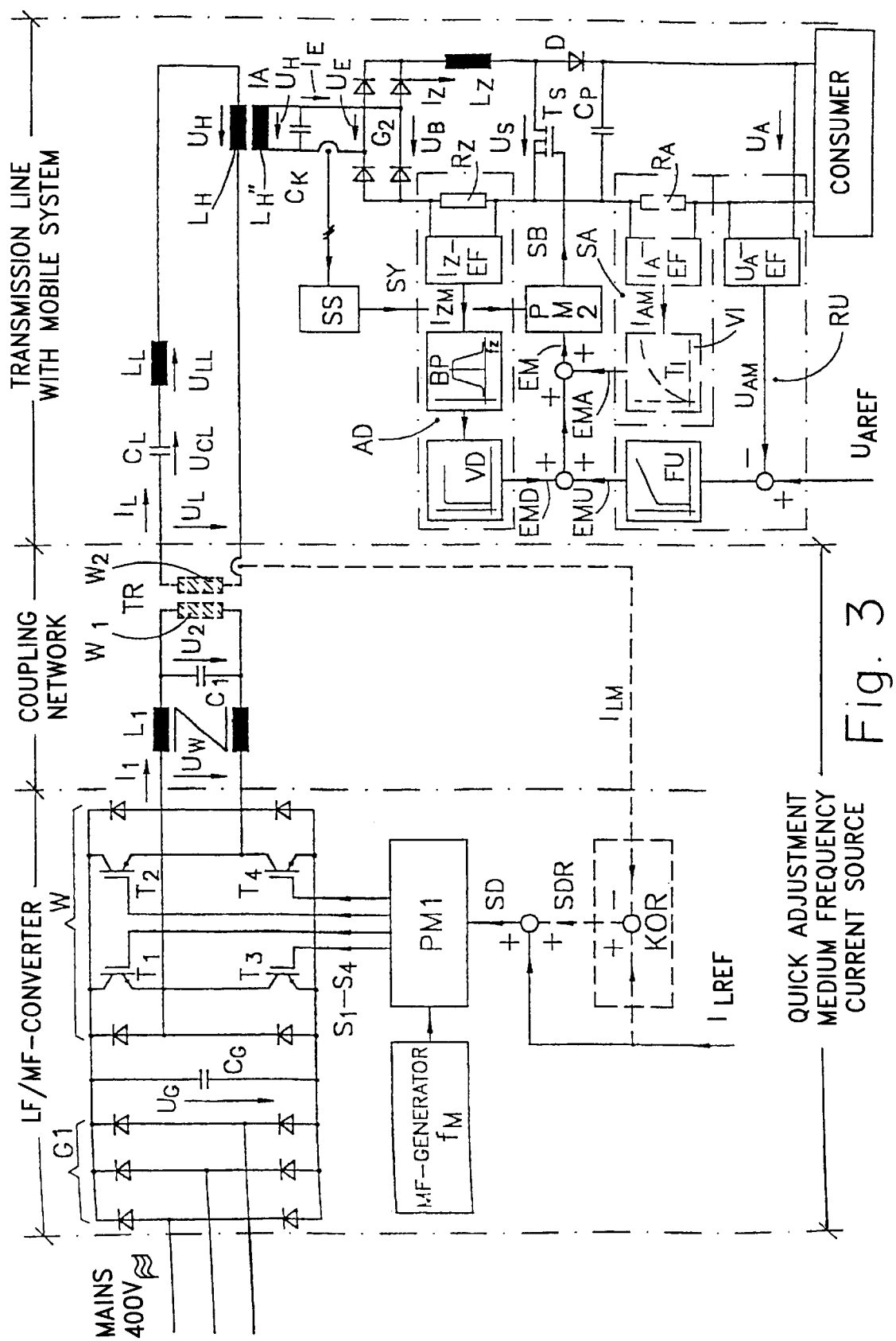
FIG. 3: which shows the circuitry principle of the device according to the invention.

The circuitry principle of an especially advantageous device for performing the method of the invention is shown in FIG. 3. In its left half, the especially fast-adjusting medium-frequency source, comprising the LF/MF converter and the coupling network, is shown. Via a transformer TR, it supplies the transmission line in the right half of FIG. 3, which has a mobile system. In principle, it should be assumed that a plurality of systems based on the same principle, for example 10 or more such systems, are coupled inductively to the same transmission line.

Figure 4:
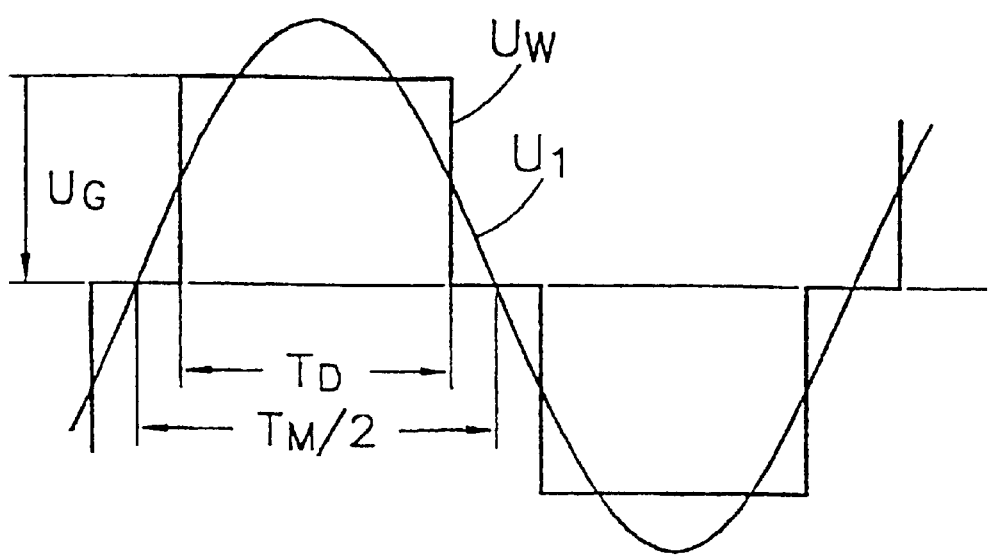
FIG. 4: which is a plot over time of the pulsed output voltage $U_W$ of the low-frequency/medium-frequency (LF/MF) converter and the associated fundamental voltage oscillation $U_1$.

The LF/MF converter comprises a rotary current bridge rectifier G1 followed by a single-phase pulse inverter W. The two converters are connected to one another via a DC intermediate circuit having the direct voltage $U_G$ and the buffer capacitor $C_G$. The IGBTs T1–T4 of the inverter are turned on and off, via the signals S1–S4 generated in a pulse width modulation stage PM1, in such a way that the pulsed alternating voltage $U_W$ shown in FIG. 4 occurs at the coupling network connected to the inverter. The frequency $f_M$ of this alternating voltage is constant and is delivered to the modulation stage from a frequency generator. Via the signal SD, also delivered to the modulation stage, the pulse width $T_D$ of the alternating voltage $U_W$ can be adjusted infinitely variably from zero up to the maximum value $T_M/2$, or in other words half the period length of the frequency $f_M$. In the process, the fundamental oscillation U1, also shown in FIG. 4, varies in its effective value from zero up to its maximum value.

Figure 5A:
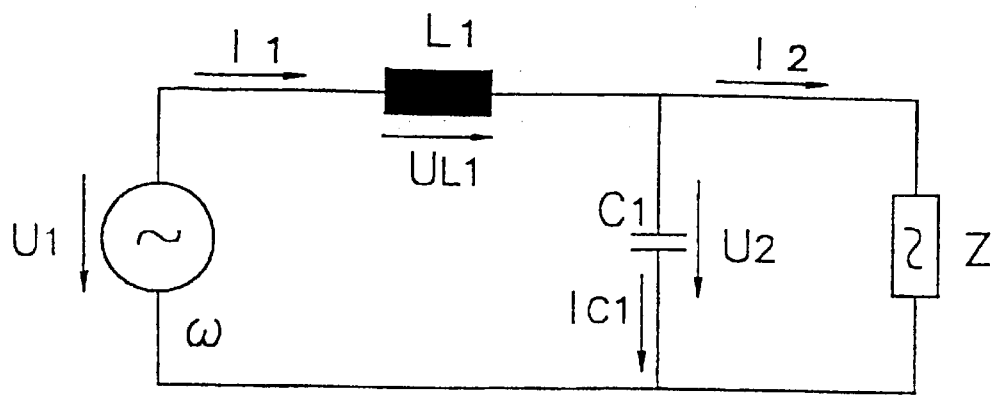
FIG. 5a: which shows a substitute circuit diagram for forming an impressed MF current.

The coupling network substantially comprises a series oscillating circuit with an inductive resistor $L_1$ and a capacitor $C_1$; the transmission path is coupled to the capacitor $C_1$. The network acts as a filter, which suppresses the harmonics in the pulsed alternating voltage $U_W$ and transmits the fundamental oscillation to the transmission line. Further discussion of the coupling network of the invention will therefore be restricted to its fundamental oscillation behavior. This will be done in conjunction with the substitute circuit diagram of FIG. 5a and the vector diagrams in FIGS. 5b and 5c.

With the aid of complex variables, the output voltage $U_2$ of the substitute circuit diagram is calculated as:

$$U_2 = \frac{U_1}{j\omega L_1} \cdot \frac{1}{j\sqrt{\frac{C_1}{L_1}}\left(\frac{\omega}{\omega_1} - \frac{\omega_1}{\omega}\right) + \frac{1}{Z}},$$

In this equation, omega=$2\pi f_M$, and omega$_1$=$1/\sqrt{(L_1 C_1)}$.

In the design according to the invention of the series oscillating circuit for the resonant situation where omega$_1$=omega, the output voltage $U_2$ to be tapped at the capacitor $C_1$ and the output current $I_2$ delivered to an arbitrary impedance Z are calculated as $$U_2 = -j\frac{U_1}{\sqrt{\frac{L_1}{C_1}}} \cdot Z, \quad I_2 = -j\frac{U_1}{\sqrt{\frac{L_1}{C_1}}}$$

The relationships show that in resonance, the LF/MF converter shown in FIG. 3 and the series oscillating circuit connected to it form a medium-frequency source, which drives a current $I_2$ that is dependent only on the fundamental oscillating voltage $U_1$ and on the dimensioning of the series oscillating circuit into an arbitrary impedance Z and thus also into the transmission line, which in FIG. 3 is connected to the capacitor $C_1$ via the transformer TR.

The voltage $U_2$ that is established at the capacitor $C_1$, or in other words at the output of the medium-frequency source, is equal to the product of the current $I_2$ and the connected impedance A. For the power $P_1$ transmitted by the coupling network, the following equation is generally valid:

$$P_1 = \frac{U_1^2}{\sqrt{\frac{L_1}{C_1}}} \cdot \frac{R}{\sqrt{\frac{L_1}{C_1}}}$$

Here R is an imaginary ohmic resistor in the current path of $I_2$.

The equation for the output current of the current source $I_2$ shows that this current is adjustable via the fundamental voltage oscillation $U_1$ and thus via the pulse width $T_D$ by means of the signal SD delivered to the pulse width modulation stage PM1. The signal SD can, as FIG. 3 shows, match the desired value of the transmission conductor current $I_{LSOLL}$. In this case, the desired value controls the transmission conductor current $I_L$.

If the pulse width $T_D$ is specified, however, then the fundamental voltage oscillation $U_1$ and thus also the transmission conductor current $I_L$ fluctuates with the intermediate circuit voltage $U_G$ or the supply voltage. Component tolerances, which also depend on the temperature, for instance, can also cause further deviations of the transmission conductor current $I_L$ from the desired value. If greater demands of precision of the power to be transmitted are made, it is then advantageous, as shown in dashed lines in FIG. 3, to measure the transmission conductor current and to regulate the deviation of the measurement variable $I_{LM}$ from the desired value $I_{LSOLL}$ to zero, using a regulator KOR which generates a signal SDR as a further component of the signal SD that controls the pulse width $T_D$. However, this regulation brings about only a correction of the transmission conductor current $I_L$ for the sake of achieving higher precision, and it does not adversely affect the fast adjustment of this current in the event of changes in the power transmitted.

Figure 5B:
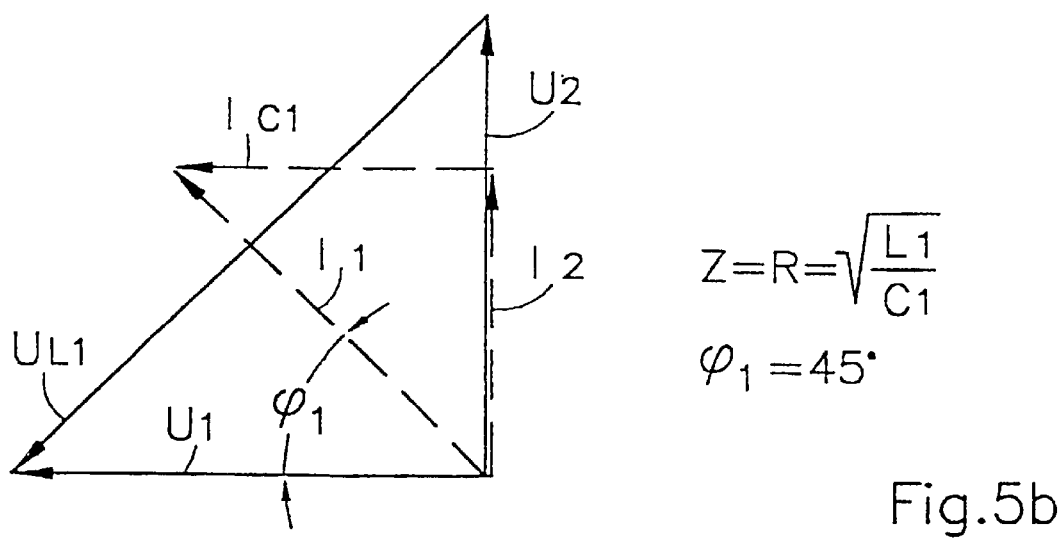
FIG. 5b: which shows a vector diagram for the substitute circuit diagram of FIG. 4a for the load situation.
Figure 5C:
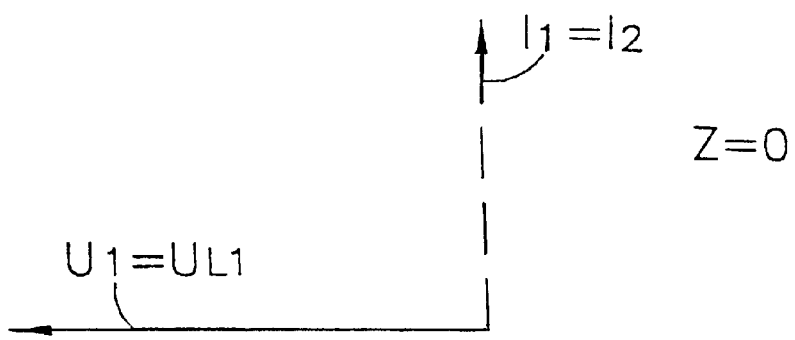
FIG. 5c: which shows a vector diagram for the substitute circuit diagram of FIG. 4a for the idling or no-load situation.

The vector diagrams in FIGS. 5b and 5c show two special cases of the load on the current source of the invention. In FIG. 5b, the impedance Z is an ohmic resistor R, whose resistance matches the oscillation resistance $\sqrt{(L_1/C_1)}$ of the series oscillating circuit. IN this case, the output current $I_2$ and the capacitor current $I_{C1}$ are equal, and the inverter output current $I_1$ trails the fundamental voltage oscillation $U_1$ by the phase angle $\phi=45°$. It has been proven that in this load situation, the idle power, referred to the power $P_1$, of the inductive resistor $L_1$, and thus its dimensions are at a minimum. The coupling network of the invention is therefore advantageously dimensioned in such a way, for transmitting a given power $P_1$, that the power P1 is attained under the condition $R=\sqrt{(L_1/C_1)}$. In the idling situation, R=0. In the case where all the line inductances are compensated for, it is also true that Z=0. This is equivalent to a short-circuited capacitor $C_1$ and the vector diagram in FIG. 5c.

The coupling network of the invention has excellent damping properties in the preferred load range during operation of $0<R\leq\sqrt{(L_1/C_1)}$, and upon sudden changes in the load resistance R, it oscillates without overoscillation to the new steady state, within a few half-periods of the medium frequency $f_M$. The consequence for the medium-frequency source of the invention, comprising the LF/MF converter described in conjunction with FIGS. 3 and 4 and the coupling network described in conjunction with FIGS. 3 and 5a–5c, is a substantially shorter adjusting time $T_S$ than is attainable with a medium-frequency source of the type in the prior art.

By the choice of the transformation ratio $w_1/w_2$ of the transformer TR in FIG. 3, the effective resistances of the substitute resistors $R_{XN}'$ over the transmission line at the rated power consumption of the mobile system are adapted such that at the capacitor $C_1$, their sum meets the condition $\Sigma R_{XN}'=\sqrt{(L_1/C_1)}$.

Figure 6A:
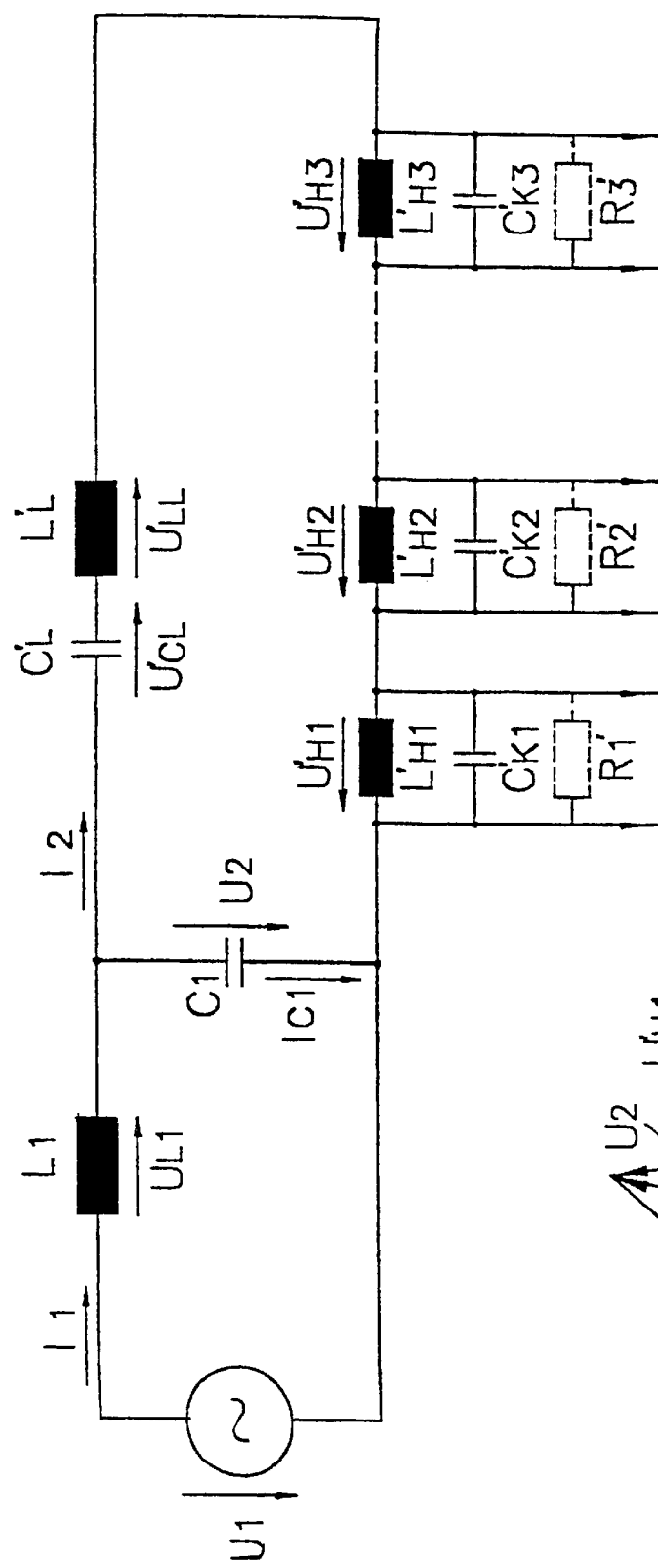
FIG. 6a: which is a substitute circuit diagram of the transmission line with current impression and with a plurality of consumers coupled to it.
Figure 6B:
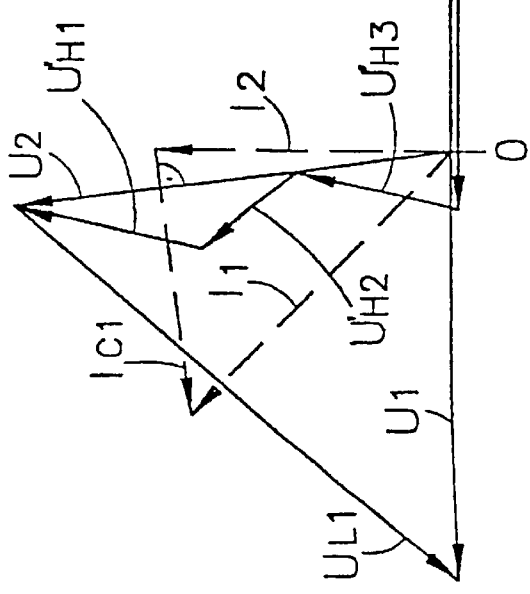

FIG. 6a shows the substitute circuit diagram of the device according to the invention, with a transmission line and three mobile systems. The portion of the device that is coupled to the medium-frequency source is represented by the circuit variables transformed to the current source side. These are the inductance $L_L'$ of the transmission line, the capacitance $C_L'$ which largely compensates for the voltage at the inductive resistor $L^{L'}$, and of the mobile systems, the transformed primary inductances $L_{HX}'$ of the inductive pickups having the capacitances $C_{KX}'$ and the substitute resistances $R_X'$ for arbitrary powers transmitted. In general, as the vector diagram in FIG. 6b shows, for long transmission lines 200 m in length, for instance, the voltage $U_{LL}'$ at the inductive resistor $L_L'$. is greater than the sum of all the voltages $U_{HX}'$ corresponding to the partial powers transmitted. Because of the virtually complete compensation of the voltage $U_{LL}'$ by the capacitor voltage $U_{CL}'$, only the difference between the two voltages enters into the output voltage $U_2$ of the current source. The output voltage $U_2$ is defined essentially by the resultant vectors of the partial voltages of $U_{H1}'$, $U_{H2}'$, and $U_{H3}'$.

The inductive resistor $L_L'$ of the transmission line and the capacitor $C_L'$ are large energy stores, in accordance with the length of the voltage vectors $U_{LL}'$ and $U_{CL}'$, and are connected between the output of the medium-frequency source and the inductive pickups of the mobile systems. These energy stores do not affect the dynamic behavior of the line transmission, however, because on account of the constancy of the current $I_2$ in the event of changes in the power transmitted they do not change their energy content and thus do not change their voltage, either, and the rate of change of the voltages $U_{HX}'$ generated by the inductive pickups is limited by the converter-actuator of the invention in the mobile systems in such a way that the fast-adjusting medium-frequency source follows these voltage changes without deviations.

In conjunction with the arrangement shown in the right half of FIG. 3 for the converter-actuator of the invention with the regulation according to the invention, it will now be explained how this converter-actuator limits the rate of change in the power picked up via the inductive pickups, so that their adjusting time $T_A$ is longer than the adjusting time $T_S$ of the medium-frequency source. The inductive pickup $I_A$ is shown as a transformer, whose secondary inductive resistor $L_H''$ together with a capacitor $C_K$ forms a parallel oscillating circuit. The capacitor $C_K$ furnishes what is as a rule the high magnetizing current of the inductive pickup, which is embodied as an air gap transformer. The parallel oscillating circuit is connected to the input of the rectifier G2 of the converter-actuator. A step-up converter, comprising an inductive resistor $L_2$, a controllable power semiconductor TS, a diode D, and a capacitor $C_P$ acting as a buffer store are connected downstream of the rectifier.

This power portion of the converter-actuator of the invention differs from the power portion that is shown in FIG. 10 of the publication cited above as prior art only in having one measuring resistor $R_Z$ for detecting the intermediate circuit direct current $I_Z$ and one measuring resistor $R_A$ for detecting the consumer current $I_A$. Current detecting stages $I_Z$-EF, $I_A$-EF are connected to the low-impedance measuring resistors and prepare the current signals $I_{ZM}$, $I_{AM}$ for processing in the regulating electronics. As will be described below, these current signals are needed only in refinements of the device of the invention.

The essential distinction from the converter-actuator of the prior art resides in the information content, and thus in the formation of the signal SB that turns the controllable power Eras semiconductor TS on and off. In the device of the invention, the signal SB is delivered to the controllable power semiconductor TS from a pulse width modulation stage PM2, which converts and input signal EM of the modulation stage into the pulsed signal SB in such a way that the ratio of the OFF time $T_W$ of the controllable power semiconductor TS to the cycle time $T_Z$ is proportional to the value of the input signal EM, and the cycle time $T_W$ is on the order of magnitude of one-half the period length, or $T_M/2$, of the medium frequency $f_M$.

The pulse width modulation stage PM2, to which a signal SY for specifying the cycle time $T_Z$ and the signal EM for specifying the switching time ratio $T_W/T_Z$ are delivered, enables the infinitely variable adjustment of the power $P_L$ picked up from the transmission line. A high frequency of the signal SY, which for example is on the order of magnitude of twice the medium frequency $f_M$, leads to a low inductance at the inductive resistor $L_Z$ in the step-up converter and enables fast changes in the power transmitted. On the other hand, to avoid transient phenomena on the transmission line, the rate of change of the transmitted power should not be any faster than the possible rate of change in the power supplied by the current source to the transmission line.

In regulator stages for regulating the consumer voltage $U_A$ to a desired value $U_{ASOLL}$, impermissibly high rates of change in the transmitted power occur if the regulator stages switch the transmitted power supplied to the buffer capacitor among only a few values, or if in an infinitely variable change, they make the transmitted power $P_L$ follow along with overly rapidly changing consumer powers.

In the device of the invention, a voltage regulator stage RU supplies the input signal EM of the pulse width modulation stage PM2 with a signal component EMU, whose rate of change is dimensioned by the capacitance of the buffer capacitor $C_P$ and the transfer function FU of the voltage regulator stage such that the signal component EMU, upon a sudden change in the output current $I_A$, does not attain its new final value until after the adjusting time $T_A$ of the converter-actuator, which is longer than the adjusting time $T_S$ of the medium-frequency source.

The voltage detecting stage $U_A$-EF is used to convert the high consumer voltage $U_A$ from 320 V, for example, into the voltage measuring signal $U_{AM}$ delivered to the regulating stage; it is of no significance to the invention.

Undesired transient phenomena and oscillation are possible in the mobile systems even without the cooperation of the transmission line and the medium-frequency source. Thus the parallel oscillating circuit comprising the inductive resistor $L_H"$ of the inductive pickup and the capacitor $C_K$, via the rectifier G2 with the inductive resistor $L_Z$ of the step-up converter, forms a virtually undamped oscillatable system with a natural frequency $f_Z$, which depending on the size of the inductive resistor $L_Z$ is approximately in the range from 0.15 $f_M$ to 0.3 $f_M$. Natural oscillations in this system are damped according to the invention by providing that an active damping stage AD detects these oscillations in the intermediate circuit current $I_Z$, forms a signal SMD from them by means of a bandpass filter BP and an amplifier VD, and delivers this signal, as a further component of the input signal EM, to the pulse width modulation stage PM2. The bandpass filter has the effect that only oscillations in a frequency range around the natural frequency $I_Z$ that are included in the intermediate circuit current contribute to forming the signal EMD. If an oscillation of frequency $f_Z$ is superimposed on the intermediate circuit current $I_Z$, then a resultant change in the intermediate circuit current causes a modulation of the blocking time $T_W$ and thus of the voltage $U_S$ in the intermediate circuit in such a way that the voltage $U_S$ counteracts a rising oscillation of the intermediate circuit current toward higher amplitudes.

A reduction in the dynamic deviations in the output voltage $U_A$ from its desired value $U_{ASOLL}$ at major, sudden changes in the consumer power is attainable if a current imposition stage SA, shown in dashed lines in FIG. 3, reinforces the regulation of the output voltage. To that end, from the current measuring signal $I_{AM}$, via a delay stage VI, a further signal component EMA is delivered to the input signal EM of the pulse width modulation stage PM2. The signal EMA is dimensioned such that in the steady state, via the modulation stage, it adjusts a ratio of the OFF time $T_W$ of the controllable power semiconductor to the cycle time $T_Z$ at which the power $P_L$ picked up from the transmission line virtually matches the consumer power $P_V$. Sudden changes in the consumer current $I_A$ are transmitted to the signal component EMA with a time constant $T_1$ via the delay stage $V_I$, so that the adjusting time $T_A$ of the converter-actuator, which is longer than the adjusting time $T_S$ of the medium-frequency source, is adhered to.

Figure 7A:
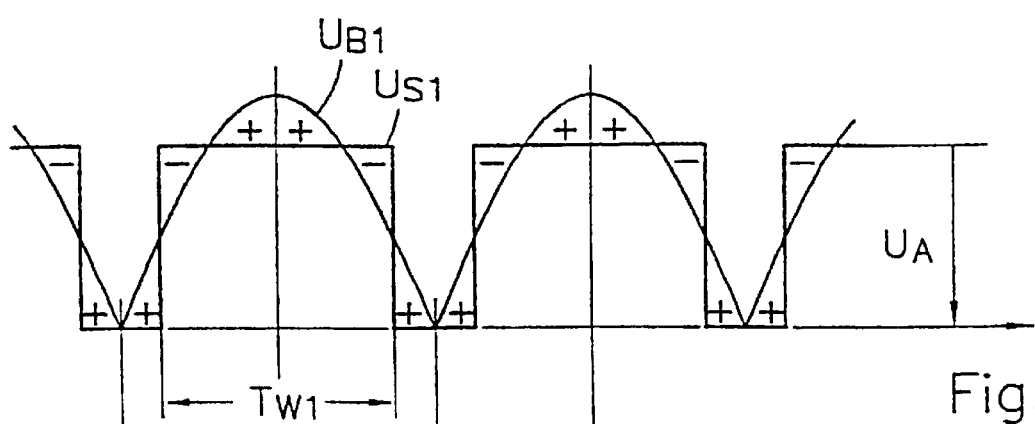
FIG. 7a: which is a plot over time of the rectifier output voltage $u_9$ and the pulse width modulated switch voltage $U_S$ of the converter-actuator of the invention in a mobile system with high consumer power.
Figure 7B:
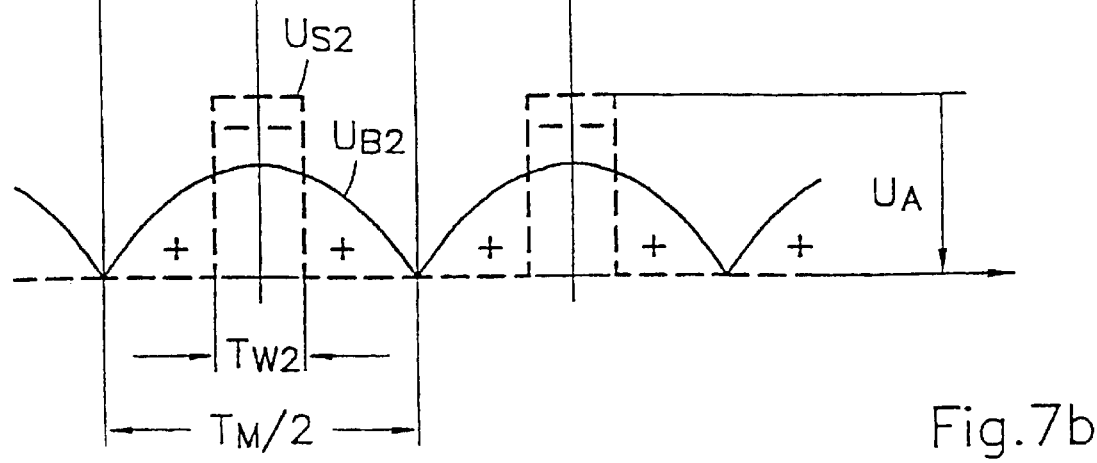
FIG. 7b: which shows a plot of voltage corresponding to FIG. 7a at low consumer power.

For the converter-actuator in the mobile system, as a rule the goal is to need less space and to be lighter in weight. For the inductive resistor $L_Z$, it has been proven that for a given waviness of the intermediate circuit current $I_Z$, these variables attain a minimum if, as shown in FIGS. 7a and 7b for two blocking times $T_W$ of different length and thus for two different values of the transmitted power $P_L$, the half-oscillations of the rectifier output voltage $U_B$ are symmetrical to the voltage pulses of the switch voltage $U_S$. To achieve this symmetrical position of the voltages $U_S$ and $U_B$, the pulse width modulation stage PM2 is supplied with a synchronizing signal SY, which generates a synchronizing stage SS from the medium-frequency input current $I_E$ or the input voltage $U_E$ of the converter-actuator, which varies the formation of the output signal SB of the pulse width modulation stage in such a way that the cycle time $T_Z$ of the signal SB precisely matches the duration of one-half of a period, or $T_M/2$, of the medium frequency $f_M$, and approximately half of the OFF time $T_W$ of the controllable power semiconductor TS is located >0 before, and half after, the peak value of the output voltage $U_B$ of the rectifier G2.

What is claimed is:

1. A method for inductive transmission of electric power from a medium-frequency source at a frequency ($f_M$) to one or more mobile consumers via an extended transmission line and via inductive pickups ($I_{AX}$, $I_{AY}$), assigned to the mobile consumers, the mobile consumers being connected to buffer memory, the method comprising the steps of;

providing downstream converter-actuators for adjusting the power ($P_{LX}$, $P_{LY}$) that is picked up from the transmission line and delivering said adjusted power to the buffer memory;

supplying the transmission line from a current source with a medium-frequency current (IL) that is constant in its effective value during power transmission;

adjusting, infinitely variably, the output voltage (UL) of the medium-frequency source, within a maximum adjusting time ($T_S$) which lasts for only a few half-periods of the medium-frequency ($f_M$), to the value that corresponds to the total variable power picked up from the transmission line; and adjusting, infinitely variably and with a limited rate of change, with the converter-actuator connected between the buffer memory and the inductive power pickup (IA) of each power consumer, a power ($P_L$), picked up from the transmission line and delivered to the buffer memory, within an adjusting time ($T_A$), which is longer than the adjusting time ($T_S$) of the medium-frequency source.

2. The method of claim 1, further comprising the step of:

providing a signal (SB) that controls the converter-actuators, the signal containing: information on said infinitely variable adjustment of the power ($P_L$) picked up by the inductive pickup (IA) from the transmission line and delivered to the buffer memory, and information on the rate of change of this power and thus also the information for realizing the adjusting time ($T_A$) of the converter-actuator.

3. The method of claim 2, further comprising the steps of:

regulating the output voltage (UA) of the buffer memory that is delivered to the mobile consumers to a predetermined desired value ($U_{ASOLL}$); and determining the information contained in the control signal (SB) of the converter-actuator, for adjusting the power ($P_L$) picked up from the transmission line, along with its rate of change by the power ($P_V$) picked up from the consumer and by the dimensioning of the timing of this regulation.

4. The method of claim 1, further comprising the steps of:

maintaining the effective value of the current ($I_L$) supplied to the transmission line by the medium-frequency source at a constant value during the power transmission to the mobile systems, and in time ranges in which no power or only little power compared with the total power that can be transmitted is being transmitted; and controlling infinitely variably this effective value at a rate of change that is substantially below the allowable rate of change in the power that can be picked up from the transmission line.

5. The method of claim 4, further comprising the step of;

regulating the effective value of the medium-frequency current ($I_L$) supplied to the transmission line to a predetermined desired value ($I_{LSOLL}$).

6. A device for inductive transmission of electric power from a medium-frequency source at a frequency ($f_M$) to one or more mobile consumers via an extended transmission line, comprising:

buffer memory connected to said one or more mobile consumers;

inductive pickup ($I_{AX}$, $I_{AY}$) assigned to said one or more mobile consumers; and downstream converter-actuators for adjusting the power ($P_{LX}$, $P_{LY}$) that is picked up from the transmission line and delivered to said buffer memory, wherein the medium frequency source has a maximum adjusting time ($T_S$) of its output signal that is less than the adjusting time ($T_A$) of the power picked up at the consumer.

7. The device of claim 6, wherein said transmission is located between the medium-frequency source and the mobile consumer, and wherein said mobile consumer is embodied as a series oscillation circuit for this medium frequency.

8. The device of claim 6, further comprising:

a low frequency/medium frequency converter with an intermediate circuit direct voltage ($U_G$) buffer-stored by a capacitor ($C_G$) and an inverter (W), formed of controllable power semiconductors (T1, T2, T3, T4) and controlled by a frequency generator with a constant medium frequency ($f_M$), for generating a pulsed AC output voltage ($u_W$); and a coupling network connected to the AC output voltage ($u_W$) of said converter and which has a series oscillating circuit formed by an inductive resistor ($L_1$) and capacitor ($C_1$), whose resonant frequency $1/(2\pi\sqrt{L_1 C_1})$ matches the frequency ($f_M$) of said converter, and wherein the terminals of said capacitor ($C_1$) are the outputs of the medium-frequency source.

9. The device of claim 8, wherein said inductive resistor ($L_1$) and said capacitor ($C_1$) of said coupling network are dimensioned for attaining a transmission rated power ($P_N$) in accordance with the equation $\sqrt{(L_1/C_1)}=U_{IN}^2/P_N$ where $U_{IN}$, is the effective rated voltage of the fundamental oscillation of the pulsed output voltage ($u_W$) of said low-frequency/medium frequency converter.

10. The device of claim 8, further comprising:

a transformer (TR) connected between said capacitor ($C_1$) and said transmission line, having a transformation ratio ($w_1/w_2$); and substitute resistors ($R_{XN}$) coupled into said transmission line said inductive pickups ($I_{AX}$) when the rated power is picked up, wherein said transformer transforms the sum of said substitute resistors into a value ($\Sigma R_{XN}$) that is effective at said capacitor ($C_1$) and that is equal to the oscillation resistance $\sqrt{(L_1/C_1)}$ of said coupling network.

11. The device of claim 6, further comprising:

a pulse width modulation stage (PMI), wherein turning on and off of one of said controllable power semiconductors (T1, T2, T3, T4) of said low-frequency/medium frequency converter is effected by said pulse width modulation stage so that a pulsed AC output voltage ($U_W$) of variable pulse width ($T_D$) is created, and a signal ($S_D$) for adjusting the pulse width ($T_D$) and thus an effective value ($U_1$) of the fundamental oscillation of said AC output voltage ($u_W$) is delivered to said pulse width modulation stage.

12. The device of claim 6, further comprising:

a regulator (KOR); and a pulse width modulation stage (PMI), wherein the desired value ($I_{LSOLL}$) of the medium-frequency current supplied to said transmission line and the measured value ($I_{LM}$) of the medium-frequency current actually supplied are delivered, and wherein said regulator (KOR) forms one component (SDR) of said input signal (SD) of a pulse width stage (PMI) which signal adjusts said variable pulse width ($T_D$).

13. The device of claim 6, further comprising:

a capacitor ($C_L$); and an inductive resistor ($L_L$), wherein said capacitor ($C_L$) is connected in series with said transmission line, and said capacitor ($C_L$) is dimensioned as to its capacitance such that it compensates for the inductive voltage drop ($U_{LL}$) that occurs at the inductive resistor ($L_L$) of said transmission line.

14. The device of claim 6, further comprising:

a second pulse width modulation stage (PM2); and a controllable power semiconductor, wherein said second pulsed width stage (PM2) converts an input signal (EM) applied to it into a pulsed signal (SB) delivered to said controllable power semiconductor, in such a way that the ratio between the OFF time ($T_W$) of said controllable power semiconductor and the cycle time ($T_Z$) is proportional to the value of the input signal (EM), and wherein the cycle time ($T_Z$) is on the order of magnitude of one-half of the period length ($T_M/2$) of said medium frequency ($f_M$).

15. The device of claim 14, further comprising:

a voltage regulator stage (RU); and a buffer capacitor ($C_P$), wherein said voltage regulator regulates the output voltage (UA) of said buffer capacitor ($C_P$) to a desired value ($U_{ASOLL}$), and delivers a signal component (EMU) of the input signal (EM) to said second pulse width modulation stage (PM2), and wherein the rate of change of said signal component (EMU) is dimensioned by the capacitance of said buffer capacitor ($C_P$) and the transmission function (FU) of said voltage regulator stage (RU), such that in the event of a sudden change in the output current (IA) of said buffer capacitor ($C_P$), the signal component (EMU) attains its new value only after the adjusting time ($T_A$) of the converter-actuator, which is longer than the adjusting time ($T_S$) of said medium-frequency source.

16. The device of claim 14, further comprising:

an active damping stage (AD); and an oscillatable partial circuit comprising a parallel oscillator circuit ($L_{H'}$, $C_K$) of an inductive pickup, a rectifier (G2) and an inductive resistor ($L_Z$) of an intermediate circuit, wherein said active damping stage (AD) delivers a further signal component (EMD) of said input signal (EM) to said second pulse width modulation stage (PM2) for damping natural oscillation of the intermediate circuit current ($I_Z$) in said oscillatable partial circuit.

17. The device of claim 14, further comprising:

a current imposition stage (SA) having a delay stage (VI), wherein said current imposition stage (SA) delivers a signal component (EMA) of said signal (EM) to said second pulse width modulation stage (PM2), said signal component, in a steady state condition, is proportional to the output current (IA) and is dimensioned such that via said second pulse width modulation stage (PM2) it adjusts a ratio between the OFF time ($T_W$) of said controlled power semiconductor and a cycle time ($T_Z$) at which the power ($P_L$) picked up from said transmission line nearly matches the consumer power ($P_V$), and it transmits sudden changes in the output current (IA) to said signal component (EMA) with a delay, so that the adjusting time ($T_A$) of said converter-actuator, which lasts longer than the adjusting time ($T_S$) of said medium-frequency source, is adhered to.

18. The device of claim 14, further comprising:

a rectifier (G2); and a synchronizing stage (SS) generated by a synchronizing signal (SY) from one of: said medium-frequency input current (WE) and said output voltage (UE) of said converter-actuator, said synchronizing signal (SY) being delivered to said second pulse width modulation stage (PM2) and varies the formation of an output signal (SB) of a pulse width modulation stage, in such a way that the cycle time ($T_Z$) of said output signal (SB) precisely matches the duration of one-half of the period length ($T_M/2$) of said medium frequency ($f_M$), and the OFF time of said controllable power semiconductor (TS) is located approximately half before and half after the peak value of the output voltage ($u_B$) of said rectifier (G2).

* * * * *